Dec. 21, 1937.　　　P. A. NIRDLINGER　　　2,103,013
PORTABLE SURGICAL LAMP
Filed Dec. 3, 1934　　　3 Sheets-Sheet 1
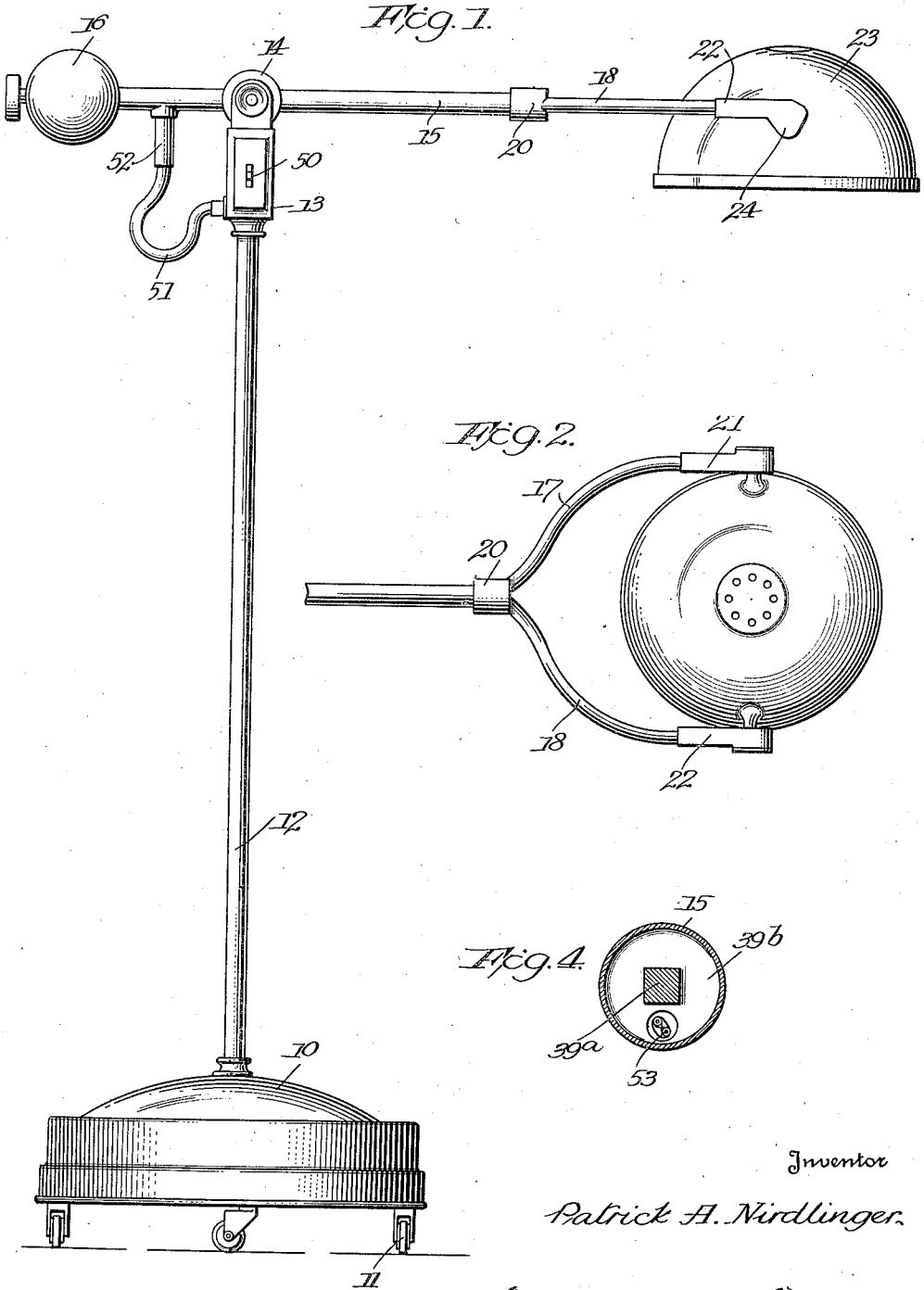
Inventor
Patrick A. Nirdlinger

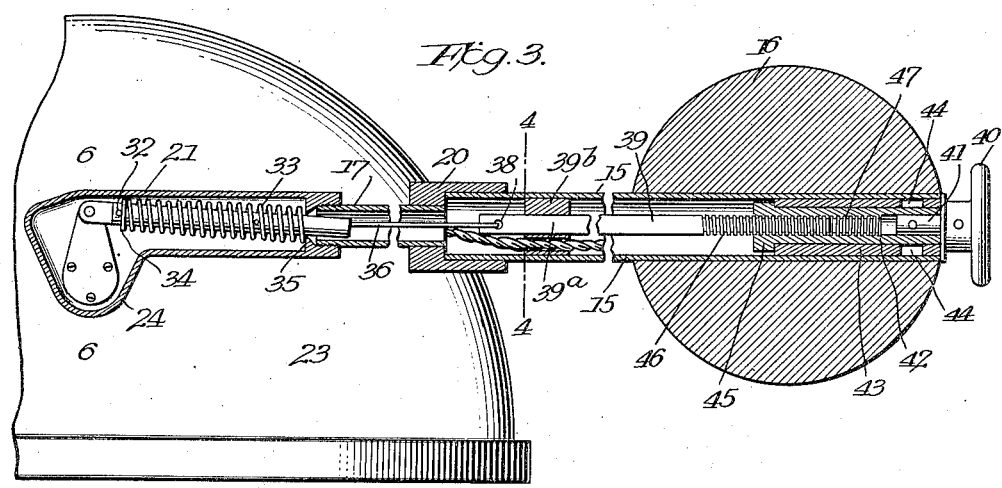
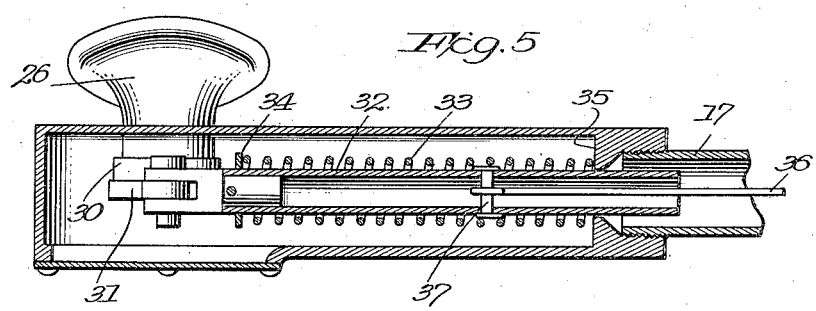
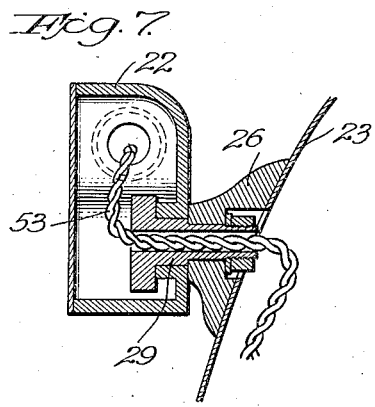
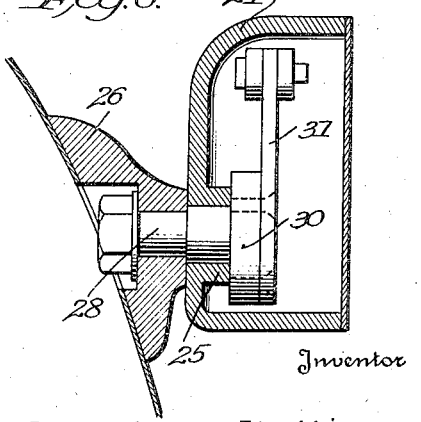

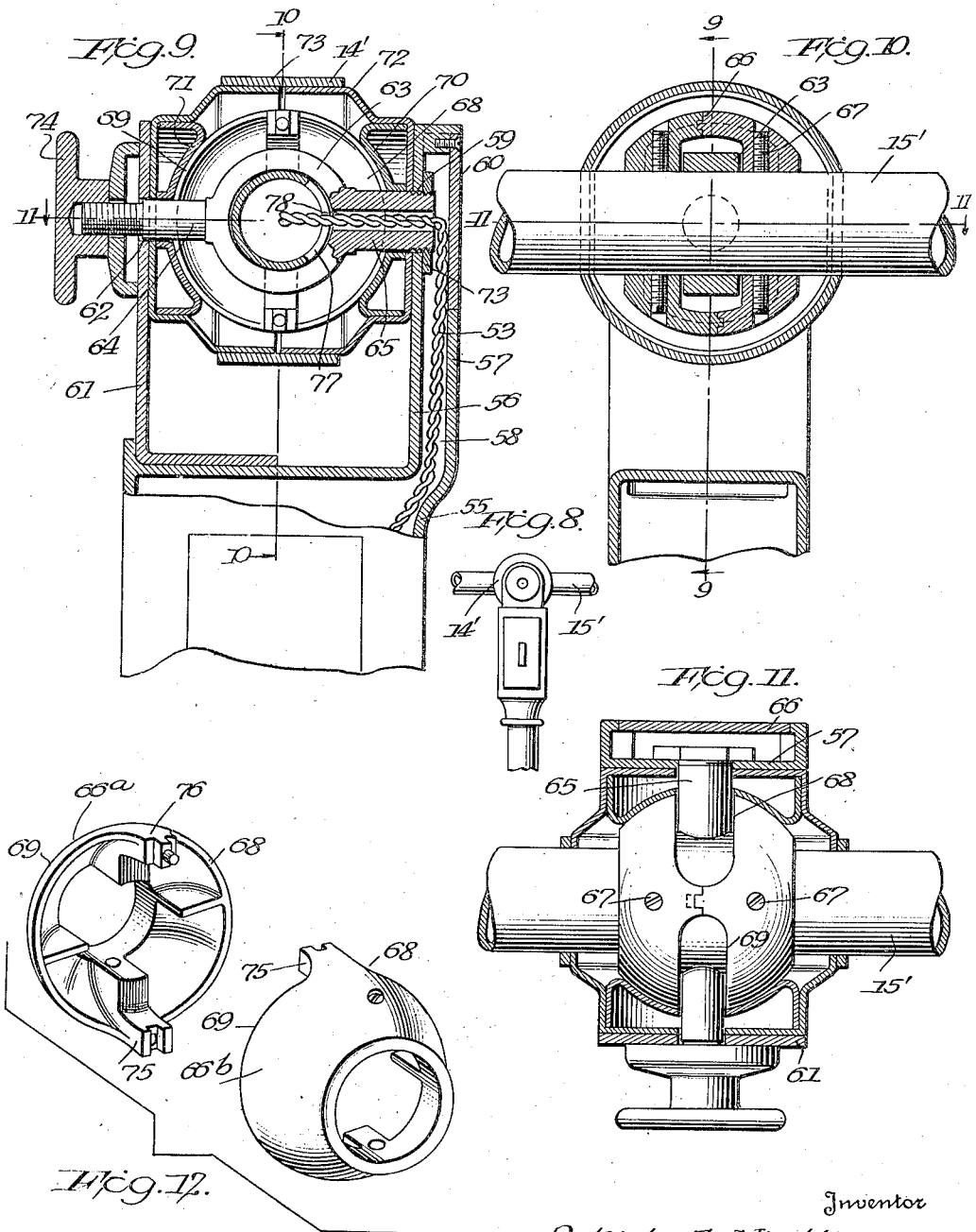

Patented Dec. 21, 1937

2,103,013

UNITED STATES PATENT OFFICE 2,103,013

PORTABLE SURGICAL LAMP

Patrick A. Nirdlinger, Madison, Wis., assignor, by mesne assignments, to Scanlon-Morris Company, Madison, Wis., a corporation of Wisconsin Application December 3, 1934, Serial No. 755,795

7 Claims. (Cl. 248—123)

This invention relates to surgical lamps, or to lamps peculiarly adapted for use in operating rooms, dispensaries, clinics and the like. More particularly it relates to a lamp of this general class which is portable and adjustable, so that a beam of light may be projected to any desired point.

The present application is a continuation-in-part of my copending application Serial No. 704,577, filed December 29, 1933, for Portable surgical lamps, which application has become Patent No. 2,012,284, dated August 27, 1935.

It is a primary object of the present invention to simplify and improve devices of this kind. More particularly, it is an object of the invention to provide improved means for adjusting the lamp projector in any direction, which means may be controlled by an attendant positioned at a point remote from the projector itself.

It is a further object of the invention to provide novel supporting means for the projector so that it may be adjusted to project its beam in any direction. Furthermore, the mechanical connections between the projector and the operating handle or handles may be concealed from view, so that no unnecessary parts are exposed in the operating room, and the sanitary characteristics of the device are thereby improved. Also the external appearance of the device is thus simplified and made pleasing to the eye.

It is a further object of the invention to provide novel means whereby the electric conduit extending from the base or support of the lamp to the light projector may be entirely concealed from view. In this connection, it is an object of the invention to provide a novel form of universal joint through which an electric conduit may be threaded in such manner that it will not become damaged by relative movement of the parts.

Other and further objects and advantages of the invention will become apparent from a consideration of the following description of the illustrative embodiment of the invention, shown in the accompanying drawings, in which:

Figure 1 is a side elevation of a surgical lamp constructed in accordance with the invention.

Figure 2 is a top plan view of the projector and supporting fork.

Figure 3 is a sectional view, with parts broken away, showing the operative connections for tilting the projector on its pivoting axis.

Figure 4 is a sectional view on line 5a—5a of Figure 5.

Figure 5 is a horizontal sectional view of a portion of Figure 3.

Figure 6 is a transverse vertical sectional view taken on line 6—6 of Figure 3, showing the pivotal connection on one side of the projector.

Figure 7 is a similar view taken through the pivotal connection on the other side of the projector.

Figure 8 is a fragmentary side elevation, similar to Figure 1, but showing a modified form of universal joint supporting means.

Figure 9 is a vertical sectional view taken on line 9—9 of Figure 8.

Figure 10 is a vertical sectional view taken on line 10—10 of Figure 9.

Figure 11 is a horizontal sectional view of Figures 9 and 10 taken on lines 11—11, and Figure 12 is a perspective view of the ball member of the universal joint, with the two halves separated.

Referring to Figure 1, the lamp of the present invention is preferably mounted upon a base 10 having casters 11 which permit its ready removal from place to place as desired. A vertical post 12 projects upwardly from the base and is provided at its upper end with a bracket 13. This bracket may be rotatably mounted on the post 12, for instance by a screw thread, or any other convenient construction, so that the bracket may be turned through one complete rotation. In some cases it may be found desirable to have the bracket 13 rigidly mounted on the post and to provide the rotatable connection at the lower end of the post where it is secured in the base 10. Either construction is within the scope of my invention.

The bracket 13 functions as a part of a ball and socket universal joint connection represented generally, in Figure 1, by reference character 14. This joint may conveniently be in the form of the joint shown in my prior Patent 1,901,527, granted March 14, 1933, and in such a case, it is necessary to provide an electric conduit 51 bridging the joint, as explained below. On the other hand, if it is desired to eliminate an exposed electric conduit, such as is disclosed in Figure 1, a novel form of joint may be used, as illustrated in Figures 8 to 12 inclusive. In accordance with this phase of the invention, all of the electric conduits are concealed.

A substantially horizontal bar 15 is carried in the joint 14 for limited universal movement about the center of that joint. This bar has a counterweight 16 secured to one of its ends, and a fork comprising arms 17 and 18 secured to its other end. The bar and both of the fork arms are preferably hollow and the interior bores thereof are in communication through the connecting sleeve 20. The outer ends of each of the fork arms are provided with housings 21, 22 in which the lamp projector 23 is pivotally mounted, by means now to be described.

Each of the housings is formed with an offset portion, or enlargement 24, and in the wall of this enlargement a bearing aperture 25 is disposed. The lamp projector 23 has, on opposite sides of its outer surface, a pair of brackets 26, 27 (Figures 6 and 7) and outwardly extending trunnions 28, 29 secured therein. There trunnions project into and through the bearings 25 and permit tilting of the light projector with respect to the fork and the housings 21, 22.

Referring to Figures 3 to 7 inclusive, it will be noted that the trunnion 28 is provided with an enlargement 30 on the end disposed within the housing 21. A short lever 31 is secured to the enlargement and has its upper end extending upwardly near the top of the housing 21, offset from the pivoting axes in the bearings 25. A link 32 is pinned to the end of the lever and projects rearwardly therefrom toward the rear end of the housing. A compression spring 33 surrounds the link and bears at one end against an abutment washer 34, or the like, and at the other end against the rear inner face 35 of the housing. Thus, the spring tends constantly to force the lever 31 in a counter-clockwise direction in Figure 3.

A convenient means for effecting tilting movement of the light projector by remote control is disclosed in the drawings. Obviously, many variations in the specific arrangement may be resorted to without departing from the invention. A wire 36 is shown as being connected to the link 32, for instance, by a pin 37. The wire is threaded rearwardly through the fork arm 17, through the sleeve 20 into the interior of bar 15. The inner end of the wire is connected, through a hole 38 or some other convenient connection, to the angularly shaped end 39a of a rod 39. This end of the rod is slidably mounted in a bushing 39b having an angular bore, and fixed in the interior of bar 15. The other end of the rod 39 is connected by a suitable threaded connection to an operating handle 40 positioned at the end of the bar 15, outwardly of the counter-weight 16. This threaded connection may be in the form disclosed in Figure 3, but any equivalent construction may be employed without departing from the invention. In the arrangement of parts illustrated, the handle 40 is secured to a stem 41 which is pinned to an internally threaded sleeve 42. A bushing 43 is secured in the end of the bar 15 and constitutes a bearing for the sleeve 42. The bushing has a pair of diametric apertures 44, which facilitate insertion of the pin connecting the stem 41 to sleeve 42. The sleeve 42 has, on its inner end, an enlarged head 45 which abuts the bushing 43 and prevents withdrawal of the parts therethrough.

The rod 39 has a screw thread 46 formed on its end which cooperates with an interior thread 47 in the sleeve. Thus, rotation of the handle 40 will impart longitudinal movement to the rod 39, because the latter is restrained from rotation by bushing 39b. This movement in one direction will be transmitted through the wire 36 to the link 32, with the result that the lever 31 will be pulled backwardly against the action of spring 33, to tilt the light projector. Rotation of the handle 40 in the opposite direction will permit the spring to expand and tilt the lamp projector in the other direction.

It will thus be seen that the light projector of the present invention may be moved in any direction for adjustment purposes. As stated above, the bracket 13 is mounted for rotation about a vertical axis. The joint 14 is such that the bar 15 may be oscillated about its own axis to tilt the projection from side to side. Also the bar may be rocked about a horizontal axis extending at right angles to its own axis, to raise and lower the projector. These movements may be effected by an attendant manipulating the handle 52, which depends from the bar 15 at a point remote from the light. The means which permit the projector to be tilted about the pivoting axis of the trunnions 28, 29 complete the universally adjustable mounting of the projector, and make it capable of a wide variety of uses.

The electrical connections for the lamp positioned in the projector 23 have been constructed and arranged in a novel manner in the present device. A cable from an appropriate source leads to the base 10 and wires extend therefrom up through the vertical post 12. A switch 50, preferably of the mercury tube type, is carried by the bracket 13, and the electric wires may lead through a flexible cable 51 from the switch upwardly through the operating handle 52 to the interior of the bar 15. The wires run lengthwise in the hollow bore of the bar and are threaded through the hollow fork arm 18, which is the arm that does not carry the operating wire 36.

In the modification shown in Figures 8 to 12, the cable 51, extending exteriorly from the switch 50 to the bar 15, has been eliminated. The details of a universal joint which permit the electric wires to be entirely concealed therein, without danger of fouling will now be described.

Referring to Figure 9, the switch housing 55 is provided with a pair of upstanding rear supporting walls 56, 57, defining a passage 58 communicating with the interior of the housing. The inner wall 56 is provided with a bearing aperture 59 and the outer wall is provided with an opening and an access plate 60. The switch housing also carries an upstanding forwardly disposed supporting wall 61 provided with a bearing aperture 62. The members 56, 61 serve as a supporting means for the joint 14' and the various parts carried thereby.

The rod 15' carries a collar 63 in slidable relation thereon, and the collar is provided with diametrically projecting trunnions 64, 65 journaled respectively in apertures 62, 59. A ball member 66, which may be formed in two halves 66a, 66b, is fixed to the bar 15' by set screws or the like 67. The ball member is provided with a pair of diametrically disposed slots 68, 69, through which the trunnions project.

Pressure cups 70, 71 are slidably mounted on the trunnions in frictional engagement with opposite sides of the ball member. The several parts of the joint are enclosed within a two-part housing 72, and the joint between the two parts is closed by a ring 73 or the like. The trunnion 65 is provided with a lock nut 73 disposed within the chamber 58, and the other trunnion 64 has an end of reduced diameter upon which a pressure applying knob 74 is threaded. From a consideration of the relation of parts shown in Figure 9, it will be apparent that the knob 74 is capable of applying more or less pressure through the friction cups 70, 71 to the ball 66 which is fixed on the bar 15'. Thus, adjustable means are provided for varying the frictional resistance to movement of the various parts of the joint. Resistance to oscillation of the bar 15' about the axis of the trunnions 64, 65 is also effected by frictional engagement between the inner faces of the supporting members 61—56 and the adjacent outer faces of the housing 72.

The ball 66, as stated above, may be made in two halves and, as shown, these elements may be die stampings which are substantially identical to one another. The construction is such that projections 75, 76 are provided on the two halves and these elements are provided with interfitting ribs and grooves and pins, and apertures. When the two parts of the ball are assembled in accordance with the disclosure of Figure 12, the spaces between the projections 75, 76 provide the two slots 68, 69, and it should be noted that the slot 68 is considerably wider than the other. This is of importance because the trunnion 65 is preferably larger than the trunnion 64. The projections 75, 76, when assembled, constitute abutments which mark the ends of the slots and limit the relative turning movement between the collar 63 and its trunnions on one hand, and the ball member on the other.

The bar 15 is provided with a slot 77 through its side wall opposite the trunnion 65, and the latter is provided with a longitudinal bore 78 registering therewith. The arcuate length of the aperture 77 in the bar 15' substantially equals the arcuate length of the slot 68. Thus, the bar 15' and the ball 66 cannot be turned relative to the trunnion 65 a sufficient distance to foul the wire 53. It should be noted that, as a result of the construction, disclosed in Figures 8 to 12, the wire 53 extending upwardly from the switch housing 55 is entirely concealed within the passage 58, the bore 78 of the trunnion, and the interior of the bar 15'. The elements of the joint are so constructed that the wires are not only protected and hidden from view, but they cannot be subjected to rubbing or other destructive forces.

Referring to Figure 7 it will be seen that the electric wire 53 extends into the housing 22 and is threaded through the hollow trunnion 29 into the interior of the casing of the lamp projector. Thus, the wires are substantially completely hidden from view.

It will be understood that the present invention is not limited to the details of construction shown in the accompanying drawings and described in this specification. Many modifications will occur to one skilled in the art, and all such modifications as fall within the scope of the appended claims, or their equivalents, are within the scope of the invention.

I claim:

1. A surgical lamp comprising a substantially vertical supporting post, a bracket on the upper end of said post mounted for limited rotation about a vertical axis, a substantially horizontal bar carried by said bracket and mounted for oscillation about its own axis and for tilting movement about a horizontal axis at right angles to its own axis, a counter-weight on one end of said bar, a fork projecting from the other end of said bar, and a light projector pivotally mounted between the ends of said fork, and adjustable tension means extending through the entire length of said bar from a point beyond said counterweight, through the latter, and operatively connected to said light projector for effecting tilting movement thereof about its pivoting axis.

2. A surgical lamp comprising a substantially vertical supporting post, a substantially horizontal bar supported by said post and mounted for limited universal movement with respect thereto, a single fork comprising two divergent arms projecting from and fixed with respect to one end of said bar, a light projector pivotally mounted between the ends of said fork and adjustable tension means comprising a non-rotatable, reciprocably movable rigid member and a flexible member, said means extending through said bar and through one of the arms only of said fork and operatively connected to said light projector for effecting tilting movement thereof about its pivoting axis.

3. A surgical lamp comprising a substantially vertical post, a substantially horizontal bar supported by said post for limited universal movement with respect thereto, a counterweight on one end of said bar, a fork projected from the other end of said bar, an operating handle adjacent the counter-weighted end of the bar, and a light projector pivotally mounted between the ends of said fork, and a tensionable connection extending from said operating handle through said bar and one of the arms only of said fork and connected to said light projector and comprising a compression spring urging the projector in one direction and a flexible element adapted to be tensioned against compression of the spring to urge the projector in the opposite direction, whereby manipulation of said handle effects tilting movement of said projector.

4. A surgical lamp comprising a substantially vertical supporting post, a bracket on the upper end of said post mounted for limited rotation about a vertical axis, a substantially horizontal bar carried by said bracket and mounted for oscillation about its own axis and for tilting movement about a horizontal axis extending at right angles to said bar, a counter-weight on one end of said bar, a fork projecting from the other end of said bar, and a light projector pivotally mounted between the ends of said fork, and means for tilting said projector about its pivoting axis, said means comprising a flexible tension element disposed within one arm of said fork only and having one of its ends connected to a part on said projector adjacent the pivoting axis but offset therefrom and having its other end disposed inside of said bar, a spring associated with said part and tending to tilt the projector against the tension of said element, an operating rod extending lengthwise of said bar and connected to said flexible element at one end, and means at the other end of the rod for imparting reciprocating movement thereto and linear movement to said flexible element, to tilt said light projector in either direction by cooperation of said element and said spring.

5. A surgical lamp comprising a substantially horizontal hollow bar supported intermediate its ends for limited universal movement about a definite point, a single hollow fork comprising two divergent arms only secured to one end of said bar with the bores of the fork arms in communication with the interior of the bar, a light projector pivoted between the ends of the fork arms for tilting movement about an axis transverse to the axis of said bar, an electrical conduit threaded through the bar and the bore in one of the arms of said fork and into the interior of the light projector, and a flexible tension element threaded through the other arm of said fork and operatively connected at one end to the light projector and at the other end to an actuating element in the interior of said hollow bar, a compression spring in said last mentioned arm connected to said projector and positioned to tilt the same against the tension of said tension element, said actuating element being connected to an actuator disposed exteriorly of the bar, whereby movement may be transmitted from said actuator to said light projector to tilt the latter.

6. A surgical lamp comprising a substantially horizontal hollow bar supported for limited universal movement about a point intermediate its ends, a hollow fork projecting from one end of said bar and having an enlargement at the end of each arm thereof, a light projector having trunnions journaled in said enlargements, one of said trunnions having a lever attached to its end in the adjacent enlargement and the other trunnion being hollow and constituting a portion of a conduit for an electric wire, said conduit extending through at least a portion of said bar and through the adjacent fork arm and enlargement to the interior of the light projector, a compression spring disposed within and encased by the other enlargement and operatively connected to the lever therein and tending to rock said projector in one direction on the axis of said trunnions, and a wire operatively connected to said lever and threaded through and entirely encased by the adjacent fork arm and connected through said bar to an operating handle at the opposite end of the latter, whereby the projector may be rocked in the other direction against the action of said spring.

7. A lamp support comprising an elongated hollow bar terminating at one end in hollow diverging arms, a light projector pivotally mounted between the ends of said arms, and means for tilting said projector on the pivoting axis, said means comprising a lever operatively connected to said projector and disposed interiorly of one of said hollow arms adjacent the pivotal connection, a compression spring entirely within said arm and disposed to urge said lever in one direction, and a reciprocating member connected to said lever and having a flexible part threaded through said arm into the interior of said bar and connected to a threaded rod reciprocally mounted in the bar, and an operating handle at the other end of the bar and having a threaded portion engaging the thread on said rod, whereby rotation of said handle will transmit linear movements through said rod and flexible part to rock said lever against the force of said spring.

PATRICK A. NIRDLINGER.